United States Patent
Okamura et al.

(10) Patent No.: US 8,731,132 B2
(45) Date of Patent: May 20, 2014

(54) NUCLEAR POWER PLANT, METHOD OF FORMING CORROSION-RESISTANT COATING THEREFOR, AND METHOD OF OPERATING NUCLEAR POWER PLANT

(75) Inventors: Masato Okamura, Minato-ku (JP); Tetsuo Oosato, Minato-ku (JP); Seiji Yamamoto, Minato-ku (JP); Tadasu Yotsuyanagi, Minato-ku (JP); Nagayoshi Ichikawa, Minato-ku (JP); Kenji Yamazaki, Minato-ku (JP); Junichi Takagi, Minato-ku (JP); Hidehiro Urata, Minato-ku (JP); Shunichi Suzuki, Chiyoda-ku (JP); Kenro Takamori, Chiyoda-ku (JP); Junichi Suzuki, Chiyoda-ku (JP)

(73) Assignees: Kabushiki Kaisha Toshiba, Tokyo (JP); The Tokyo Electric Power Company, Incorporated, Tokyo (JP)

( * ) Notice: Subject to any disclaimer, the term of this patent is extended or adjusted under 35 U.S.C. 154(b) by 0 days.

(21) Appl. No.: 13/362,962

(22) Filed: Jan. 31, 2012

(65) Prior Publication Data
US 2012/0128886 A1 May 24, 2012

Related U.S. Application Data

(62) Division of application No. 11/296,438, filed on Dec. 8, 2005.

(30) Foreign Application Priority Data

Dec. 9, 2004 (JP) .................................. 2004-357319

(51) Int. Cl.
*G21C 15/28* (2006.01)

(52) U.S. Cl.
USPC ........................................................ 376/306

(58) Field of Classification Search
USPC .................................................. 376/305, 306
See application file for complete search history.

(56) References Cited

U.S. PATENT DOCUMENTS 3,329,130 A * 7/1967 Cochran .......................... 122/34
3,634,147 A * 1/1972 Helwig et al. ................. 428/640

(Continued)

FOREIGN PATENT DOCUMENTS

EP          1339071 A1 *  8/2003
JP          2001-4789    *  1/2001

(Continued)

OTHER PUBLICATIONS

Kim, Y.J., "Analysis of oxide film formed on type 304 stainless steel in 288 C water containing oxygen, hydrogen, and hydrogen peroxide," Corrosion. V. 55, N. 1, pp. 81-88 (1999).*

(Continued)

*Primary Examiner* — Jack W Keith
*Assistant Examiner* — Sean P Burke
(74) *Attorney, Agent, or Firm* — Oblon, Spivak, McClelland, Maier & Neustadt, L.L.P.

(57) ABSTRACT

In a nuclear power plant, a corrosion-resistant oxide film on a surface of the metal component of a reactor structure is exposed to a high-temperature water, the corrosion-resistant oxide film containing an oxide having a property of a P-type semiconductor, and a catalytic substance having a property of an N-type semiconductor is deposited on the oxide film. The oxide film maintains the property of the P-type semiconductor.

13 Claims, 12 Drawing Sheets

(56) References Cited

U.S. PATENT DOCUMENTS

| | | | | |
|---|---|---|---|---|
| 5,582,812 | A | * | 12/1996 | Petersen et al. ............... 423/622 |
| 5,774,516 | A | * | 6/1998 | Hettiarachchi et al. ....... 376/305 |
| 5,793,830 | A | * | 8/1998 | Kim et al. ..................... 376/305 |
| 6,218,027 | B1 | * | 4/2001 | Yuse et al. .................... 428/608 |
| 6,370,213 | B1 | * | 4/2002 | Kim et al. ..................... 376/305 |
| 6,610,185 | B2 | * | 8/2003 | Kim et al. ..................... 204/404 |
| 6,724,854 | B1 | * | 4/2004 | Kim et al. ..................... 376/306 |
| 6,885,721 | B2 | * | 4/2005 | Hur et al. ...................... 376/305 |
| 6,898,259 | B2 | * | 5/2005 | Stellwag et al. .............. 376/305 |
| 6,940,939 | B1 | * | 9/2005 | Ichikawa et al. ............. 376/305 |
| 2002/0057755 | A1 | * | 5/2002 | Hemmi et al. ................ 376/313 |
| 2002/0181644 | A1 | * | 12/2002 | Hettiarachchi et al. ....... 376/306 |
| 2003/0180180 | A1 | * | 9/2003 | Okamura et al. ............... 422/14 |
| 2006/0050833 | A1 | * | 3/2006 | Ichikawa et al. ............. 376/305 |

FOREIGN PATENT DOCUMENTS

| | | | |
|---|---|---|---|
| JP | 2003-139891 | * | 5/2003 |
| JP | 2003-232886 | * | 8/2003 |
| JP | 2005-3565 | * | 1/2005 |
| JP | 2005-195346 | * | 7/2005 |
| WO | 01/71729 A1 | | 9/2001 |
| WO | 01 71729 A1 | * | 9/2001 |

OTHER PUBLICATIONS

Rahn et al., "A guide to nuclear power technology—a resource for decision making," Krieger publishing company, Malabar, Florida (1992), (ISBN: 0-89464-652-4); p. 503 of the 1992 reprint.*

Tang et al., "Nanostructured mangetite (Fe3O4) thin films prepared by sol-gel method," Journal of Magnetism and Magnetic Materials, V. 282, pp. 92-95, Nov. 1, 2004.*

Office Action issued Mar. 15, 2011, in Japan Patent Application No. 2004-357319.

Rahn et al., "A guide to nuclear power technology—a resource for decision making", Krieger publishing company, Malabar, Florida (1992), (ISBN: 0-89464-652-4); p. 503 of the reprint edition 1992.

Kim, Y.J., "Analysis of oxide film formed on type 304 stainless steel in 288 c water containing oxygen, hydrogen, and hydrogen peroxide", Corrosion—vol. 55, No. 1, pp. 81-88 (1999).

Tang et al., "Nanostructured mangetite (Fe3O4) thin films prepared by sol-gel method", Journal of Magnetism and Magnetic Materials, vol. 282, pp. 92-95 (Nov. 1, 2004).

* cited by examiner

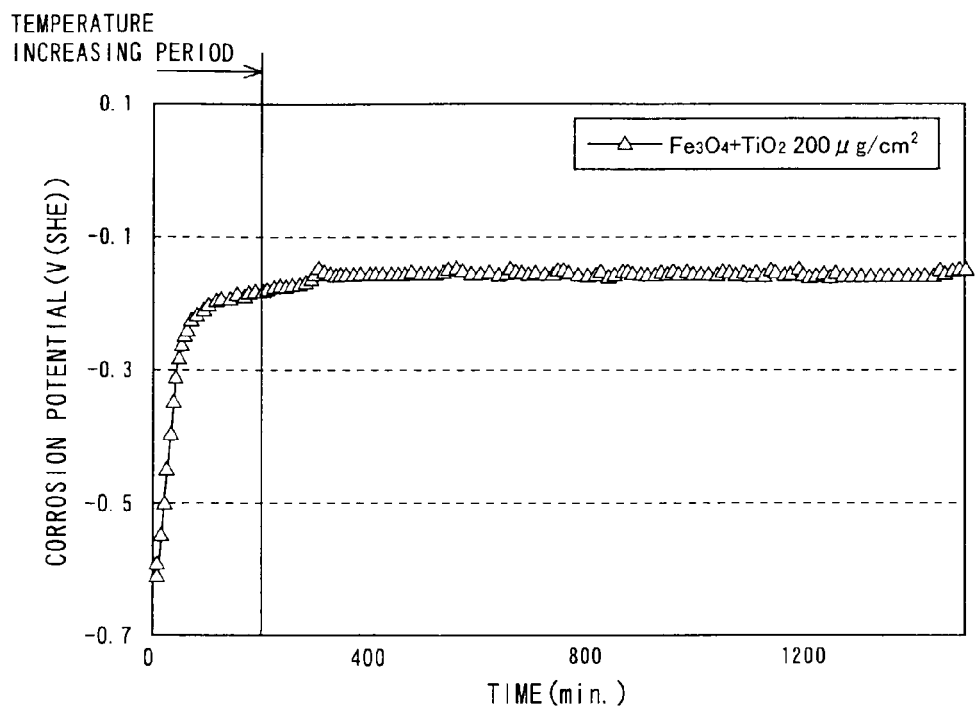
F I G. 11
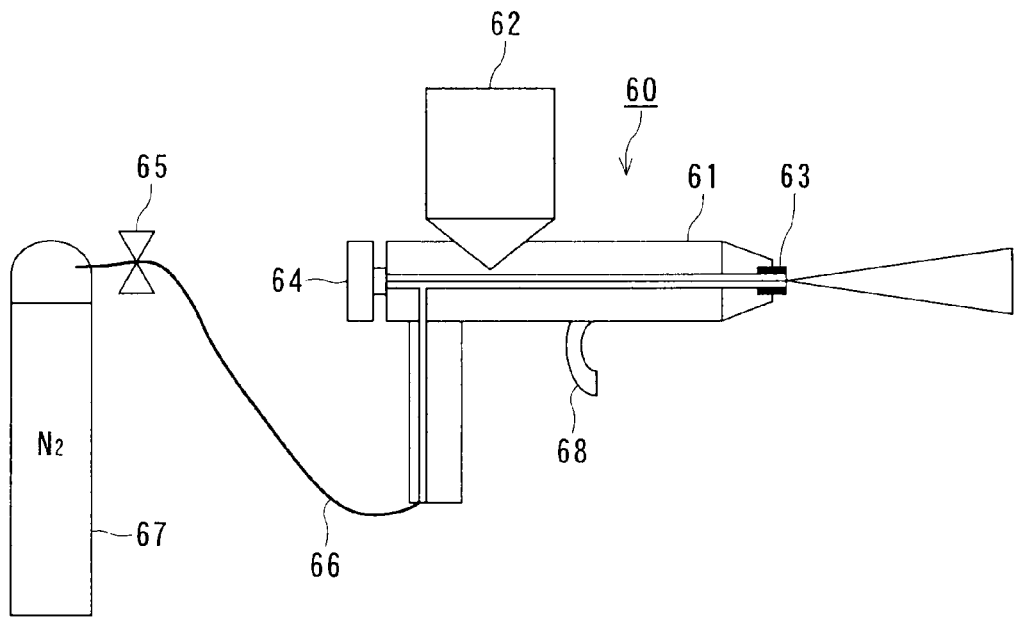
F I G. 12

NUCLEAR POWER PLANT, METHOD OF FORMING CORROSION-RESISTANT COATING THEREFOR, AND METHOD OF OPERATING NUCLEAR POWER PLANT

CROSS-REFERENCE TO RELATED APPLICATIONS

The present application is a divisional of U.S. patent application Ser. No. 11/296,438, filed on Dec. 8, 2005, which claims priority to Japanese patent application JP 2004-357319, filed on Dec. 9, 2004.

BACKGROUND OF THE INVENTION

1. Field of the Invention

The present invention relates to a technology for suppressing corrosion of metal components, such as nuclear power plant's structural components, in contact with high-temperature water, and more particularly, relates to a nuclear power plant having a corrosion-resistant coating, a method of making such a corrosion-resistant coating and a method of operating the nuclear power plant.

2. Related Art

Metal components exposed to high temperature environment are found in almost all of the modern industrial and commercial plants. For example, in the course of steam reforming in a hydrogen production chemical plant, the reaction is carried out at high temperatures and pressures. Inside a boiler or a metal pipe connected to the boiler, hot water and steam move or travel while causing corrosion. The conventional preventive measures against corrosion of metal components have involved use of expensive, special corrosion-resistant materials, improvements on the environment to which the metal components are exposed, etc. For example, in a thermal power plant, a pH control reagent, a deoxidizer, or the like is added to control water chemistry and to thereby reduce the corrosion.

In a boiling-water nuclear power plant, oxygen, hydrogen peroxide, and the like produced by radiolysis of water in the radiation field exist in a state dissolved in the reactor water. It is a well-known fact that stainless steel and nickel-based alloys, which are used for reactor structural components of the nuclear power plant, generate stress corrosion cracking in the presence of oxygen and hydrogen peroxide in a high-temperature environment such as a nuclear reactor.

Hydrogen injection of injecting hydrogen into the reactor water has applied to some BWR plants in the world to reduce oxygen and hydrogen peroxide dissolved in the reactor water (refer to GENSHIRO MIZU-KAGAKU HANDBOOK [Handbook of Water Chemistry of Nuclear Reactor System], edited by Atomic Energy Society of Japan, published by Corona Publishing Co., Ltd., on Dec. 27, 2000, p. 210). The effect of the oxygen and hydrogen peroxide reduction by the hydrogen injection is confirmed as the decrease in corrosion potential of the metal components. The generation of stress corrosion cracking and the crack growth rate depends on the corrosion potential. The lower the corrosion potential, more suppressed the generation of stress corrosion cracking and development of cracks. As a result, the lifetime of the metal components can be extended.

Other nuclear power plants in and outside Japan employ noble metal injection technology of conducting hydrogen injection after deposition of a noble metal, such as platinum (Pt) or rhodium (Rh), on surfaces of reactor structural components to accelerate reaction with hydrogen, increase the anode current to thereby decrease the corrosion potential (see the specification of Japanese Patent No. 2624906).

The meaning of the corrosion potential of the metal components is as follows. When a metal is immersed in an electrolyte, the metal shows a potential inherent to that metal. This potential is called "spontaneous potential" of that metal. A corroded metal material shows a potential different (polarized) from its spontaneous potential due to the corrosion reaction. This difference in potential is referred to as the "corrosion potential". A continuous measurement of the potential difference will estimate the progression of the corrosion.

In a uniformly corroded metal material, the cathode reaction (reduction reaction) and the anode reaction (oxidization reaction) reach an equilibrium at the intersection of the cathode reaction polarization curve and the anode reaction polarization curve. This intersection corresponds to the corrosion potential.

Another approach that has recently drawn much attention for decreasing the corrosion potential is to utilize the photocatalytic reaction. By coating surfaces of the metal components with a photocatalyst and irradiating the photocatalyst with light having wavelength near ultraviolet, electrons activated by the photoexcitation reaction cause the corrosion potential to decrease. The photoexcitation reaction can be accelerated with a noble metal disposed nearby.

Accordingly, by depositing a photocatalyst or a high-efficiency photocatalyst containing a noble metal onto surfaces of the reactor structural components and inducing photoexcitation reaction by Cerenkov radiation generated in the reactor core, the corrosion potential during operation can be reduced (for example, refer to Japanese Patent Laid-open Publication Nos. 2001-4789 and 2001-276628).

As the method of preventing parts of the metal components from corrosion in the absence of light, a technology for decreasing the potential difference by generating thermostimulated current utilizing thermal energy instead of light energy has been suggested (refer to Japanese Patent Laid-open Publication No. 2003-232886).

Another corrosion reduction method proposed is to alternately laminate N-type semiconductor coatings and P-type semiconductor coatings onto surfaces of metal components (refer to Japanese Patent Laid-open Publication No. 9-125283). Yet another corrosion method proposed is to provide a coating consisting of three or more alternately stacked layers of an anion-permselective substance and a cation-permselective substance (refer to Japanese Patent Laid-open Publication No. 11-12719).

According to the technology disclosed in Japanese Unexamined Patent Application Publication No. 2001-4789, electrons irradiated with light are activated by the photoexcitation reaction, thereby generating electrical current that decreases the corrosion potential. The corrosion prevention effect is, however, rarely expected in parts not exposed to light.

In contrast to the corrosion prevention technology utilizing photoexcitation, a technology of decreasing the corrosion potential by utilizing electrical current produced by thermostimulated electrons is disclosed in Japanese Patent Laid-open Publication No. 2003-232886. According to this technology of producing the thermostimulated current, holes generated by thermostimulation cause anode reaction to occur and thereby increase the current. In an actual cases, however, the electrons stimulated by heat recombine with holes generated by the same thermostimulation, and the electric current does not easily flow. In order to efficiently convert the stimulated electrons and holes into a flow of electrical current, charge separation needs to be reliably carried out.

Furthermore, the state that allows charge separation needs to be constantly maintained, and the ambient environmental conditions to which the metal components are exposed must be taken into consideration.

In addition, nuclear power plants have inside a substantially large number of narrowed parts and parts with complicated shapes. Thus, the corrosion prevention methods utilizing the semiconductor properties disclosed in Japanese Patent Laid-open Publication Nos. 9-125283 and 11-12719 would face difficulty in application.

SUMMARY OF THE INVENTION

The present invention was conceived in consideration of the circumstances in the prior art mentioned above and has an object to provide a nuclear power plant having a corrosion-resistant coating that can ensure suppression of corrosion due to stress corrosion cracking in various locations of reactor structural components not exposed to light and that can effectively maintain the effect of corrosion suppression for a long time.

Another object of the present invention is to provide a method of forming such a corrosion-resistant coating and a method of operating the nuclear power plant at an improved efficiency.

These and other objects can be achieved according to the present invention by providing, in one aspect, a nuclear power plant, wherein a corrosion-resistant oxide film is formed on a surface of a metal component of a reactor structure exposed to high-temperature water, the corrosion-resistant oxide film containing an oxide having a property of a P-type semiconductor, and a catalytic substance having an N-type semiconductor is deposited on the corrosion resistant oxide film so that the oxide film maintains the property of the P-type semiconductor.

In another aspect, there is also provided a method of forming a corrosion-resistant coating on a surface of a metal component of a reactor structure exposed to high-temperature water, the method comprising:

an oxide film forming step of controlling a water chemistry inside a reactor using a hydrogen injection device to deposit and/or form an oxide having a property of a P-type semiconductor in a reducing atmosphere or converting an existing oxide film; and a catalytic substance deposition step of depositing a catalytic substance on the oxide film, the catalytic substance having a property of an N-type semiconductor while retaining the property of the P-type semiconductor.

In a further aspect of the present invention, there is also provided a method of operating a nuclear reactor in which a corrosion-resistant coating is formed on a surface of a metal component of a reactor structure exposed to high-temperature water, the method comprising the steps of:

monitoring a corrosion potential at the surface of the metal component to examine a property of the oxide film; and controlling a water chemistry in the reactor to maintain and restore a corrosion-resistant oxide film.

According to the above aspects of the present invention, the corrosion-resistant oxide film can be formed so as to achieve the functions and effects of the property or performance of the N-type semiconductor while maintaining or retaining the property of the P-type semiconductor. The suppression of corrosion due to stress corrosion cracking of metal components of a reactor structure can be ensured, and the effect of suppressing corrosion of metal components can be maintained for a long period of time.

The nature and further characteristic features of the present invention will be made more clear from the following descriptions made with reference to the accompanying drawings.

BRIEF DESCRIPTION OF THE DRAWINGS

In the accompanying drawings:

FIG. 11 is a graph showing the effect of reducing the corrosion potential yielded by the combination of $Fe_3O_4$ oxide film and the $TiO_2$ catalytic substance (spray deposited);

FIG. 12 is a schematic diagram of a device for spray deposition;

DESCRIPTION OF THE PREFERRED EMBODIMENTS

The preferred embodiments of the nuclear power plant, method of forming a corrosion-resistant coating for the nuclear power plant, and method of operating the nuclear power plant according to the present invention will be described hereunder with reference to the attached drawings.

Further, it is to be noted that terms "upper", "lower", "right', "left" and the likes terms are used herein with reference to the illustrations on the drawings or actually installing state of a reactor power plant.

Figure 1:
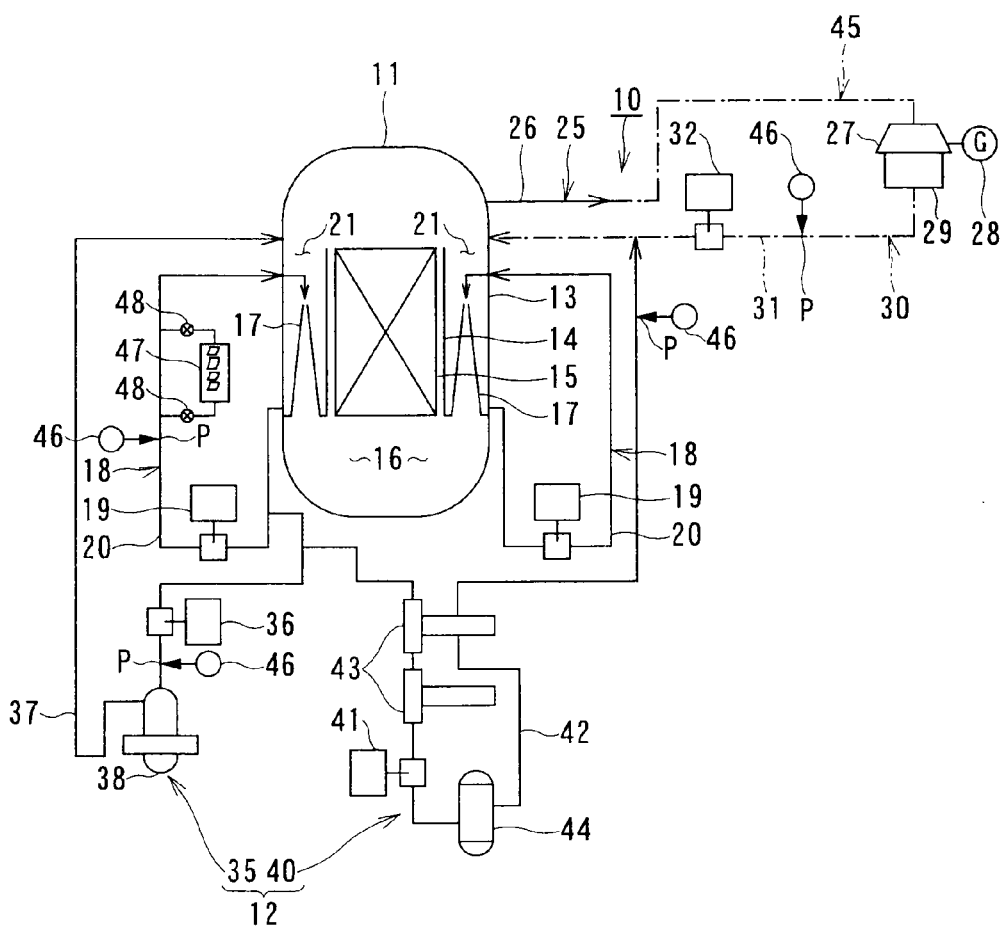
FIG. 1 is a schematic diagram showing an embodiment of a nuclear power plant according to the present invention.

FIG. 1 is a schematic diagram showing a boiling water reactor (BWR, hereinafter) 11 and a Reactor Water Clean-up system 12 of a nuclear power plant 10 according to the present invention.

The BWR 11 includes a reactor pressure vessel 13 and a cylindrical shroud 14 inside the reactor pressure vessel 13. A reactor core 15 is disposed inside the cylindrical shroud 14. A lower plenum 16 is disposed below the reactor core 15, and the reactor water inside the reactor pressure vessel 13 is introduced into the lower plenum 16 through a plurality of jet pumps 17, for example, ten jet pumps 17.

The jet pumps 17 operate by tracking the operation of recirculation pumps 19 of a pair of reactor recirculation systems 18. Each recirculation pump 19 is provided to a recirculation pipe 20 for recirculating the reactor water inside the reactor pressure vessel 13. The ejection (pump-out) side of the recirculation pipe 20 is opposed to the inlet side of the jet pump 17.

In each reactor recirculation system 18, the recirculation pump 19 is driven to discharge recirculation water from the ejection side of the recirculation pipe 20, and the flow of the discharged recirculation water merges with the reactor water around the jet pump 17 to thereby guide the reactor water into the lower plenum 16.

The flow of the reactor water is reversed in the lower plenum 16 and heated by means of nuclear reaction as it passes over the reactor core 15, thereby forming a steam-liquid two-phase flow. The steam-liquid two-phase flow is separated by a steam separator, not shown, into a steam component and a liquid component above the reactor core 15. The liquid component returns to reactor water and re-enters a downcomer portion 21 of the reactor pressure vessel 13.

The steam component is dried in a steam drier (not shown), and the resulting dry steam (main steam) is fed to a main steam system 25. The main steam fed into the main steam system 25 is then introduced into a steam turbine 27 through a main steam pipe 26 to drive a generator 28.

The expanded steam that had been used to drive the steam turbine 27 is led to a condenser 29 where the steam is cooled and condensed to give a steam condensate. The condensate passes through a condensate water supply system 30 and flows back into the reactor pressure vessel 13 via a water supply pipe 31 serving as a water supply line so as to combine with the reactor water inside the reactor pressure vessel 13. A water supply pump 32 and a multistage water supply heater (not shown) are provided to the water supply pipe 31.

The water fed into the reactor pressure vessel 13 via the condensate water supply system 30 partially circulates in the recirculation pipes 20 of the reactor recirculation systems 18 by the operation of the recirculation pumps 19.

Part of the recirculation water in the recirculation pipe 20 is circulated in a residual heat removal (RHR) system 35 with an RHR-system pump 36 or in a reactor water cleanup (CUW or RWCU) system 40 with a CUW-system pump 41.

The RHR-system pump 36 has an RHR pipe 37 diverging from the recirculation pipe 20 of the reactor recirculation system 18. The RHR pipe 37 has the RHR-system pump 36 and a heat exchanger 38. The downstream end of the RHR pipe 37 is connected to the reactor pressure vessel 13 so that part of the recirculation water can be circulated and returned to the reactor pressure vessel 13.

The pipe configuration of the RHR system 35 is designed to suit the most typical operation mode for removing decay heat after the reactor shutdown. The circulation water cooled in the RHR system 35 is sprayed from the upper portion or the top of the reactor pressure vessel 13 to cool the head unit of the reactor pressure vessel 13.

The pipe arrangement of the RHR system 35 is designed to operate in five modes, namely, a reactor shutdown cooling mode, a low-pressure water injection mode, a reactor container cooling mode, a pressure suppression pool water cooling mode, and a fuel pool cooling mode.

The reactor water cleanup (CUW) system 40 has a CUW-system pipe 42 diverging from the recirculation pipe 20 of the reactor recirculation system 18. The CUW-system pipe 42 has a heat exchanger 43, the CUW-system pump 41 and a filter demineralizer 44, and is connected to the water supply pipe 31 of the condensate water supply system 30.

The CUW system 40, the RHR system 35, a reactor auxiliary cooling system (not shown), a high-pressure reactor core spray system (not shown), and a fuel pool cooling and cleanup system (not shown) constitute the cooling water circulation system 12.

The reactor pressure vessel (RPV) 13, the reactor recirculation systems 18, the main steam system 25, and the condensate water supply system 30 constitute a reactor primary cooling system 45.

The nuclear power plant 10 has the reactor primary cooling system 45 and the cooling water circulation system 12, in each of which an austenitic stainless steel, such as SUS304 (18Cr-8Ni-0.06C), SUS304L containing 0.03% or less of C, SUS316 (18Cr-12Ni-2.5Mo) having improved corrosion and acid resistance, or SUS316L containing Mo, having excellent corrosion resistance, workability, formability and weldability, is widely used.

The nuclear power plant 10 also has injection points P for connecting with a hydrogen injection system 46. The hydrogen injection system 46 is provided to form corrosion-resistant oxide films having properties of a P-type semiconductor onto surfaces of reactor structural metal components, such as pipes, various devices, and structural materials inside the reactor.

The hydrogen injection system 46 can be connected to one or more injection points P located in the water supply pipe 31 of the condensate water supply system 30, the recirculation pipe 20 of the reactor recirculation system 18, the RHR pipe 37, of the RHR system 35, the CUW-system pipe 42 of the CUW system 40, and the like. The amount of injection hydrogen can be controlled from these injection points P. The water chemistry in the reactor can be controlled by adjusting the amount of the injection hydrogen. By controlling the water chemistry inside the reactor as mentioned above, oxide films having the properties of a P-type semiconductor can be formed on the surfaces (inner and outer surfaces) of the reactor structural metal components, such as various pipes, devices, and internal structural materials. These oxide films are corrosion resistant.

Referring to FIG. 1, the reactor is also provided with a corrosion potential analyzer 47 including a test piece for monitoring the corrosion potential and shut-off valves 48. The corrosion potential analyzer 47 is installed onto the recirculation pipe 20 of the reactor recirculation system 18.

Hereunder, preferred embodiments of the present invention will be described more specifically.

First Embodiment

A first embodiment of the present invention will be described with reference to FIGS. 2 to 4.

In the first embodiment, the austenitic stainless steel widely used in the reactor structural materials of the reactor primary cooling system 45 and the cooling water circulation system 12 of the nuclear power plant 10 is provided with corrosion-resistant oxide films.

Figure 2:
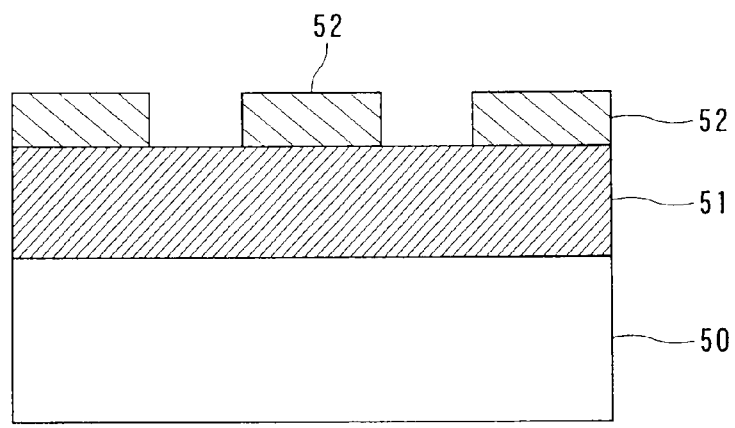
FIG. 2 is a diagram showing a corrosion-resistant coating prepared by forming an oxide film having properties of a P-type semiconductor on a surface of a metal substrate for a reactor structural component and then depositing a catalytic substance having properties of an N-type semiconductor on the oxide film.

FIG. 2 is a schematic diagram showing a surface of a metal component having a corrosion-resistant coating on the surface of SUS316L stainless steel, which is one example of the austenitic stainless steel.

In this embodiment, a corrosion-resistant, corrosion-protective oxide film (film) 51 composed of an oxide, such as $Fe_3O_4$, having the properties of a P-type semiconductor is formed on a metal base material 50 composed of SUS316L stainless steel, and titanium oxide serving as a catalytic substance 52 having the properties of a N-type semiconductor is deposited on the oxide film 51.

The catalytic substance 52 may be deposited on the oxide film 51 by forming a layer. The form of the catalytic substance 52 is not limited to the layer form. The catalytic substance 52 may be scattered into a matrix form or may be deposited as lines. The metal base material 50 is exposed to high-temperature water of 150° C. or higher, in particular, to reactor water of about 280° C.

Although FIG. 2 shows an example that uses the SUS316L stainless steel as the austenitic stainless steel for the metal base material 50, the metal base material 50 may be made of a stainless steel alloy, iron steel, a non-steel material, or a non-ferrous metal. Although the oxide film for the metal base material 50 described above is composed of $Fe_3O_4$, the oxide film may instead be formed of an oxide such as FeO, NiO, PdO, $UO_2$, $WO_2$, $Cr_2O_3$, $NiCr_2O_4$, $ZnCr_2O_4$, $CoCr_2O_4$, $FeCr_2O_4$, MnO, $Mn_2O_3$, $Mn_3O_4$, $Co_3O_4$, CoO, $Cu_2O$, $Ag_2O$, $CoAl_2O_4$, $MgCr_2O_4$, $NiAl_2O_4$, or PbO, or at least one of them. The oxide film 51 having the properties of a P-type semiconductor should be formed on the surface of the metal base material 50 exposed to high-temperature water. In an actual nuclear power plant, the thickness of the oxide film 51 is preferably 0.01 µm to 5 µm, for example.

Titanium oxide ($TiO_2$) having the properties of a N-type semiconductor and serving as the catalytic substance 52 is deposited on the oxide film 51 having the properties of a P-type semiconductor. Instead of the titanium oxide ($TiO_2$), $BaTiO_3$, $Bi_2O_3$, ZnO, $WO_3$, $SrTiO_3$, $Fe_2O_3$, $FeTiO_3$, $KTaO_3$, $MnTiO_3$, $SnO_2$, $ZrO_2$, $CeO_2$, $In_2O_3$, $Al_2O_3$, MgO, $MgFe_2O_4$, $NiFe_2O_4$, $MnO_2$, $MoO_3$, $Nb_2O_5$, $SnO_2$, $SiO_2$, $PbO_2$, $V_2O_5$, $ZnFe_2O_4$, $ZnAl_2O_4$, $ZnCo_2O_4$, or $Ta_2O_5$, or at least one of them may be used as the catalytic substance 52 that serves as the N-type semiconductor.

Figure 3:
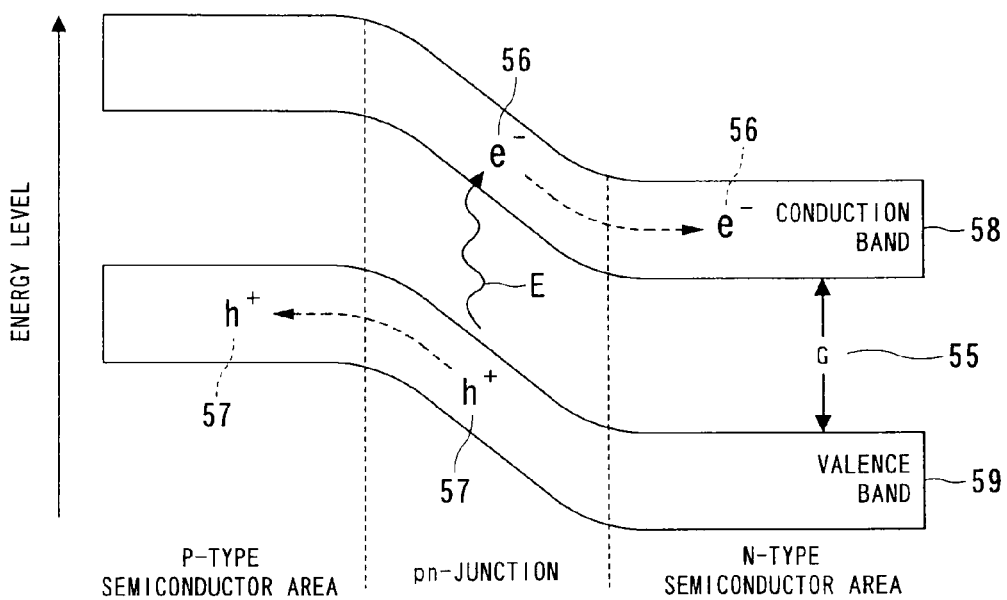
FIG. 3 is a diagram showing charge separation due to a pn junction.

A pn-junction is formed at the junction face between the P-type semiconductor and the N-type semiconductor, as shown in FIG. 3, by depositing the oxide film 51 composed of an oxide having the properties of a P-type semiconductor on the surface of the metal base material 50 and by depositing the catalytic substance 52 having the properties of an N-type semiconductor on the oxide film 51. The change in energy level causes a band 55 to contain a bandgap G.

Since the band 55 contains a gap, an electron 56 and a hole 57 produced by thermal excitation E respectively migrate to a conduction band 58 of the N-type semiconductor and a valence band 59 of the P-type semiconductor. The migration of the electron 56 and the hole 57 can suppress recombination of the electron 56 and the hole 57 and allows charge separation to proceed. The electron 56 and the hole 57 contribute to the oxidation-reduction reaction in high-temperature water and thereby change the corrosion potential.

Figure 4:
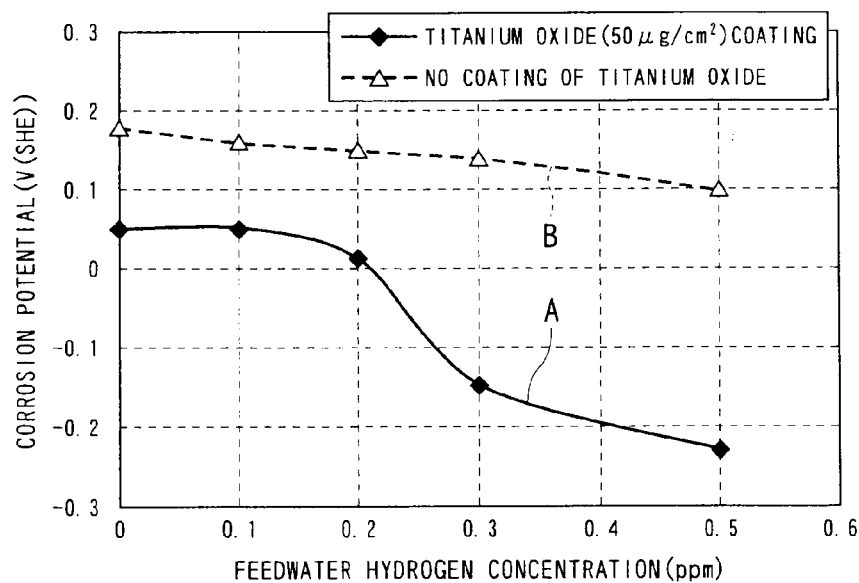
FIG. 4 is a graph showing a change in corrosion potential (280° C.) versus the amount of injected hydrogen when an oxide film composed of $Fe_3O_4$, which is a P-type semiconductor, is on a surface of a stainless steel and $TiO_2$, which is an N-type semiconductor, is deposited on the oxide film.

FIG. 4 is a graph showing dependence of the corrosion potential on the water chemistry of high-temperature water of, for example, 280° C. In the graph, the corrosion potential of a case in which the oxide film 51 composed of $Fe_3O_4$, which is a P-type semiconductor, is disposed onto the surface of the austenitic stainless steel, 316L (metal base material 50) and 10 µg/cm² or more, in particular, about 50 µg/cm², of the catalytic substance 52, which is titanium oxide ($TiO_2$) and is an N-type semiconductor, is deposited on the oxide film 51 is plotted (solid line A), and the corrosion potential of a case in which no titanium oxide is deposited is plotted (dotted line B).

In the case of the BWR 11, due to the presence of titanium oxide, the corrosion potential does not exceed −0.1 V(SHE) and is about −0.5 V when the circulation water in the recirculation pipe 20 of the reactor recirculation system 18 has a feedwater hydrogen concentration of 0.3 ppm.

As is described above, the formation of the pn-junction in the oxide film 51 causes charge separation, decreases the corrosion potential and suppresses corrosion of the metal base material 50. The lower the corrosion potential, the greater the corrosion resistance achieved by the oxide film 51.

Second Embodiment

A second embodiment of the present invention will be described hereunder with reference to FIGS. 5 and 6.

In this second embodiment, the structures identical to those of the first embodiment are referred to by adding the same reference numerals and explanation thereof is omitted herein, and the effects identical to those of the first embodiment are also attained, which are not described to avoid redundancy.

Figure 5:
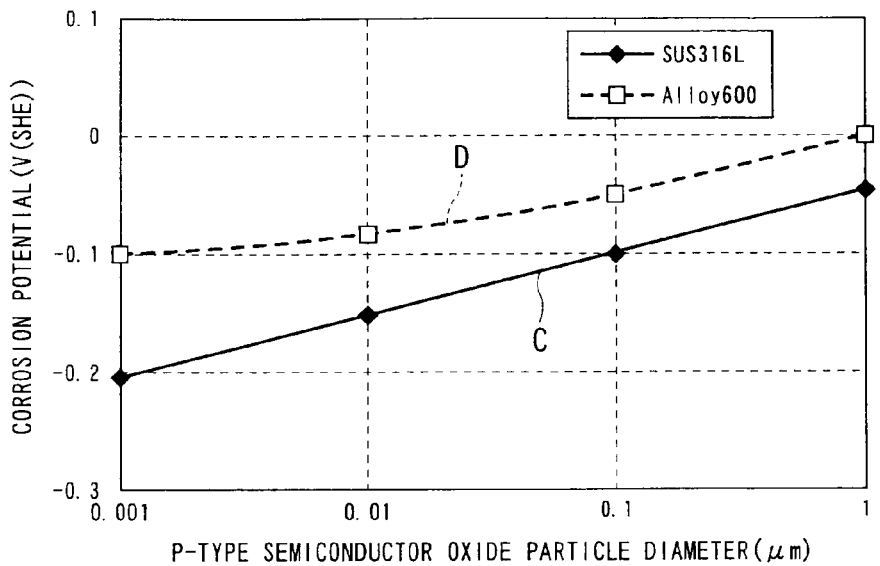
FIG. 5 is a graph showing the influence of the particle diameter of a P-type semiconductor oxide on the corrosion potential.

FIG. 5 is a graph showing the influence of the particle diameter of the oxide having the properties of the P-type semiconductor deposited on the surface of the metal base material 50 on the corrosion potential V. The graph shows results of a case in which an Fe3O4 oxide film 51 is formed on the metal component made of austenitic stainless steel, SUS316L, and a case in which an NiO oxide film 51 is formed on the metal base material 50 made of stainless steel alloy, i.e., an Ni-based corrosion-resistant alloy, Alloy 600 (Inconel 600). A solid line C shows the corrosion potential curve of the case in which the Fe3O4 oxide film 51 is formed on the austenitic stainless steel, SUS316L, and a dotted line D shows the corrosion potential curve of the case in which the NiO oxide film 51 is formed on the surface of the Ni—Cr—Fe alloy, i.e., Alloy 600.

The catalytic substance 52 deposited on the oxide film 51 is titanium oxide, and the amount of the titanium oxide is 50 μg/cm$^2$ in both the cases. The corrosion potential V is measured under water chemistry conditions of the recirculation water of the reactor recirculation system 18 having a feedwater hydrogen concentration of 0.3 ppm.

As is apparent from the results of the test in FIG. 5, the corrosion potential V shows a tendency to decrease as the particle diameter of the oxide having the properties of the P-type semiconductor decreases. As the particle diameter of the oxide ($Fe_3O_4$ or NiO) decreases, the area of the pn-junction formed between the oxide and titanium oxide, which is the N-type semiconductor, increases. Presumably, this is advantageous for the charge separation and thus decreases the corrosion potential. The results show that, since the corrosion potential needs to be −0.05 V(SHE) or less for SUS316L and 0.0 V(SHE) or less for Alloy 600, the particle diameter of the oxide needs to be 1 μm or less.

Figure 6:
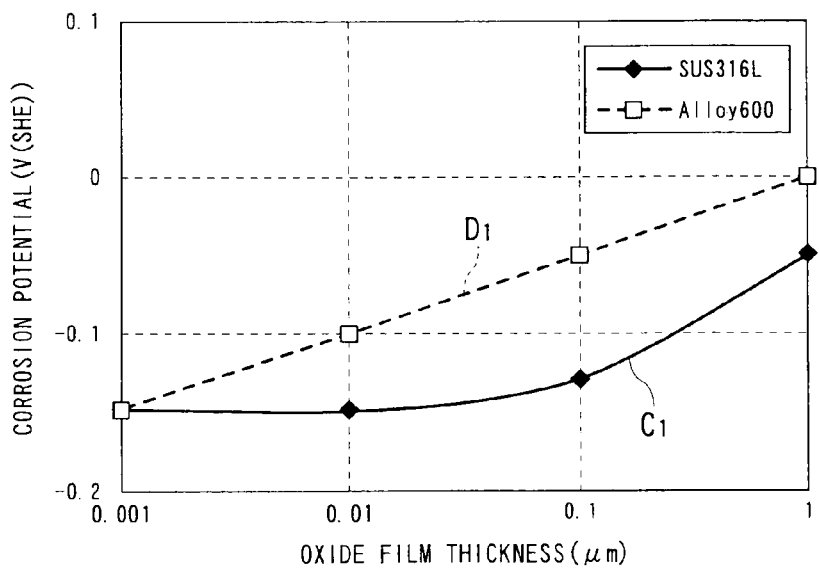
FIG. 6 is a graph showing the influence of the thickness of a P-type semiconductor oxide on the corrosion potential.

FIG. 6 is a graph showing the influence of the thickness of the oxide film 51 having the properties of the P-type semiconductor on the corrosion potential V(SHE). The graph shows the results of a case in which an Fe3O4 oxide film 51 is formed on the metal component made of austenitic stainless steel, SUS316L, and a case in which a NiO oxide film 51 is formed on the metal base material 50 made of stainless steel alloy, i.e., a Ni-based corrosion-resistant alloy, Alloy 600 (Inconel 600). A solid line C1 is a corrosion potential curve of the case in which the Fe3O4 oxide film 51 is formed on the austenitic stainless steel, SUS316L, and a dotted line D1 shows the corrosion potential curve of the case in which the NiO oxide film 51 is formed on the surface of the Ni-based stainless steel alloy of Alloy 600.

The corrosion potential curve $C_1$ for SUS316L shows that the corrosion potential does not exceed −0.05 V(SHE) with the oxide film 51 having a thickness of 0.001 to 1 μm. The corrosion potential curve $D_1$ for the Ni-based stainless steel alloy of Alloy 600 shows that the corrosion potential is maintained at 0.0 V or less with an oxide film 51 having a thickness of 0.001 μm to 1 μm. The curves $C_1$ and $D_1$ indicate that the corrosion potential is maintained at a negative value with the oxide film 51 having the properties of a P-type semiconductor and a thickness of 0.001 to 1 μm and that the interaction between the oxide, e.g., titanium oxide, and the P-type semiconductor decreases the corrosion potential.

In an actual nuclear power plant 10, deposition of an oxide film in a thickness of 0.01 to 0.05 μm is confirmed. Thus, the corrosion resistance of the oxide film can be expected even in an actual plant.

The particles of the $Fe_3O_4$ oxide film 51 are small and maintained to about 0.01 μm to about 0.1 μm diameter. The thickness of the oxide film 51 is not likely to decrease to less than 0.01 μm even when the thin film of the oxide particles is formed as a single layer. Thus, the oxide film 51 will have a thickness of at least 0.01 μm. In an actual plant, the substantial application range of the thickness of the oxide film 51 is from about 0.01 μm to about 5 μm.

The longevity of the nuclear power plant 10 is determined by the lifetimes of the metal components (metal materials) used in reactor structural components such as various devices and pipes of the reactor primary cooling system 45 and the cooling water circulation system 12.

The corrosion potential is set according to the longevity of the nuclear power plant 10 by adjusting the oxide film 51 deposited onto the surface of the metal base material 50. When a nuclear power plant 10 has a typical longevity, the corrosion potential of the metal components such as various devices and pipes of the reactor primary cooling system 45 and the cooling water circulation system 12 is maintained within regions F and H respectively shown in FIGS. 7A and 7B. When a longer lifetime of the nuclear power plant 10 is needed, the corrosion potential of the metal components of the reactor structural materials is set within regions $F_1$ and $H_1$ respectively shown in FIGS. 8A and 8B.

Figure 7A:
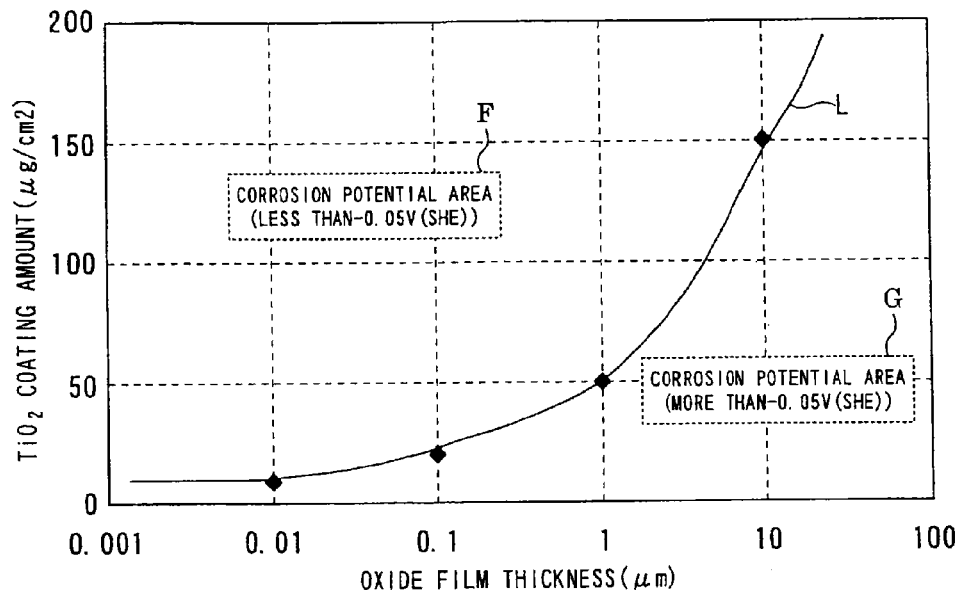
FIG. 7A shows the relationship between the thickness of an oxide film on a stainless steel and the amount of titanium oxide deposited and FIG. 7B shows the relationship between the thickness of an oxide film on Alloy 600 and the amount of titanium oxide deposited.
Figure 8A:
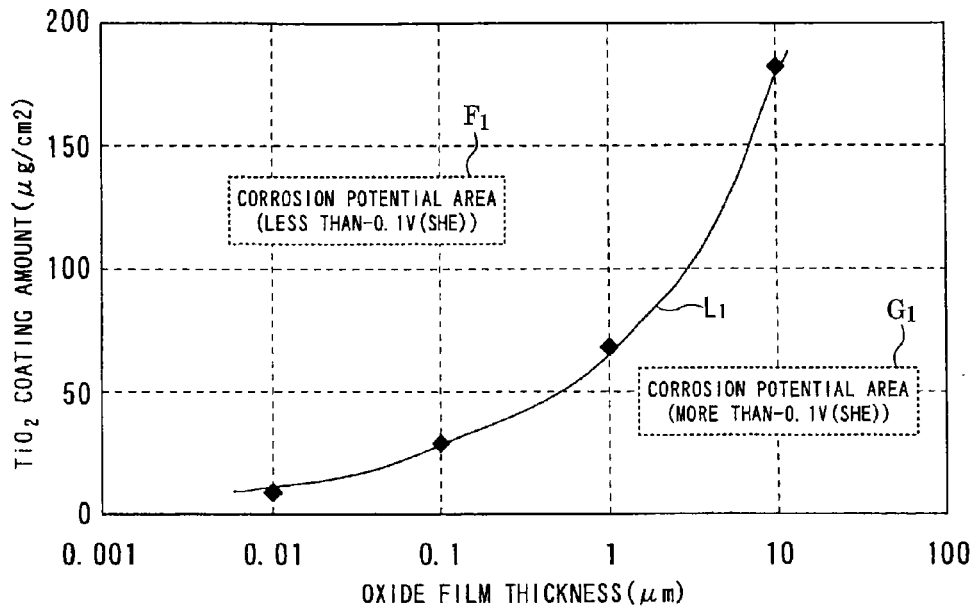
FIG. 8A shows the relationship between the thickness of an oxide film on a stainless steel and the amount of titanium oxide deposited and FIG. 8B shows the relationship between the thickness of an oxide film on Alloy 600 and the amount of titanium oxide deposited for extending the lifetime of the plant.

FIG. 7A and FIG. 8A respectively show curves L and $L_1$ each indicating the relationship between the thickness of the oxide film 51 having the properties of the P-type semiconductor and the amount of the deposited catalytic substance 52, i.e., titanium oxide ($TiO_2$) when austenitic stainless steel, SUS316L, is used as the metal base material 50. The solid line L in FIG. 7A is a corrosion potential curve that yields a corrosion potential of −0.05 V(SHE), and the solid line $L_1$ in FIG. 8A is a corrosion potential curve that yields a corrosion potential of −0.01 V(SHE). When the metal base material 50 is composed of stainless steel such as SUS316L, the use in a region G for a normal lifetime and a region G1 for extended lifetime is avoided.

Figure 7B:
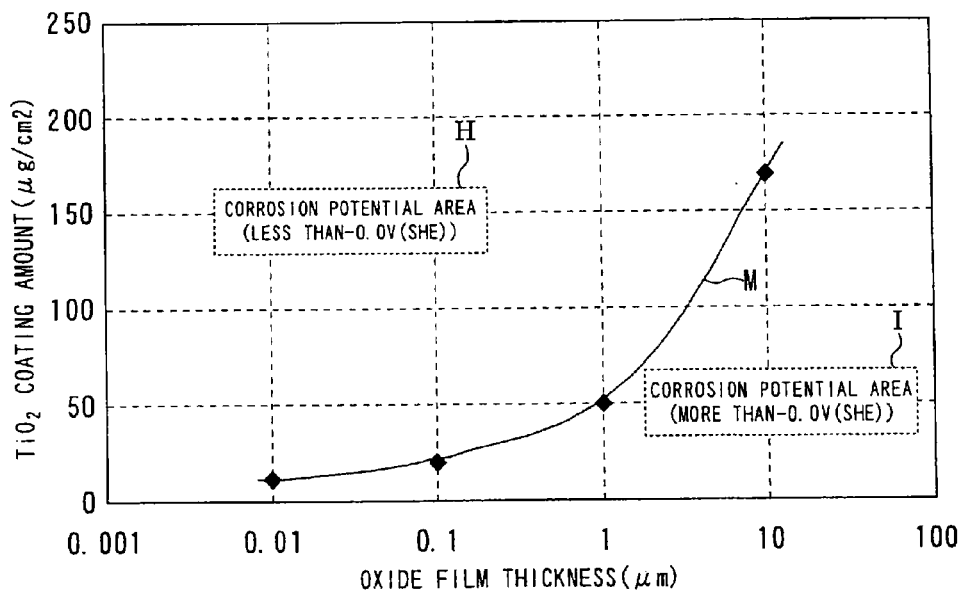
Figure 8B:
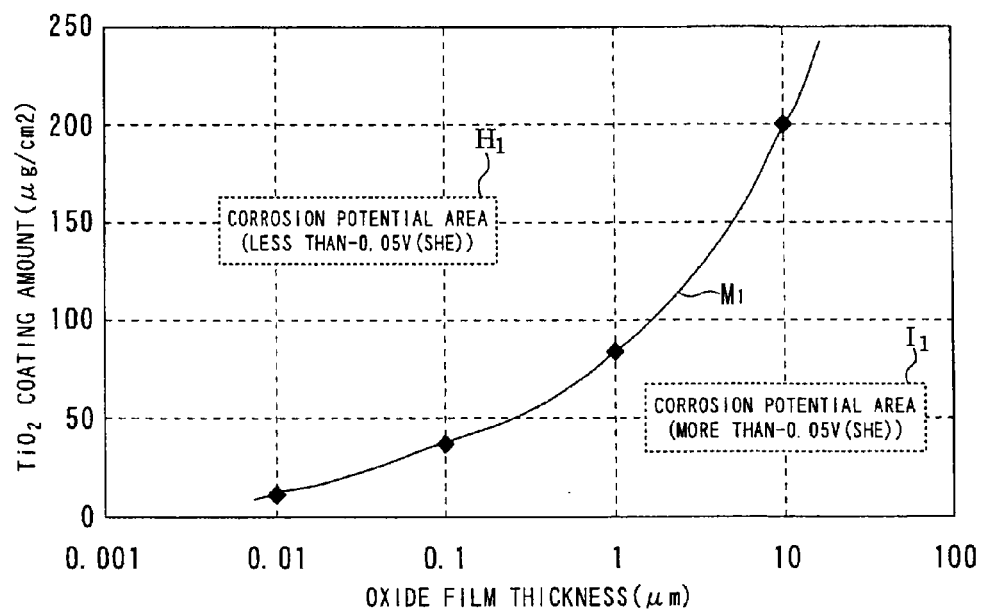

FIG. 7B and FIG. 8B respectively show curves M and $M_1$ each indicating the relationship between the thickness of the oxide film 51 composed of an oxide having the properties of a P-type semiconductor and the amount of the deposited catalytic substance 52, i.e., titanium oxide ($TiO_2$) when a Ni-based stainless steel alloy, Alloy 600, is used in the metal base material 50. Substantially the same results are yielded by using nickel oxide (NiO) instead of titanium oxide ($TiO_2$). Alloy 600 is a Ni-based corrosion-resistant alloy having 0.05C-16Cr-8Fe as the main component.

The solid line M in FIG. 7B is a corrosion potential curve that yields a corrosion potential of 0.0 V(SHE), and the solid line $M_1$ in FIG. 8B is a corrosion potential curve that yields a corrosion potential of −0.05 V(SHE). When the metal base material 50 is composed of a Ni-based stainless steel alloy, Alloy 600 (Inconel 600), the use in a region I for a normal lifetime and in a region $I_1$ for an extended lifetime is avoided.

Third Embodiment

Figure 9:
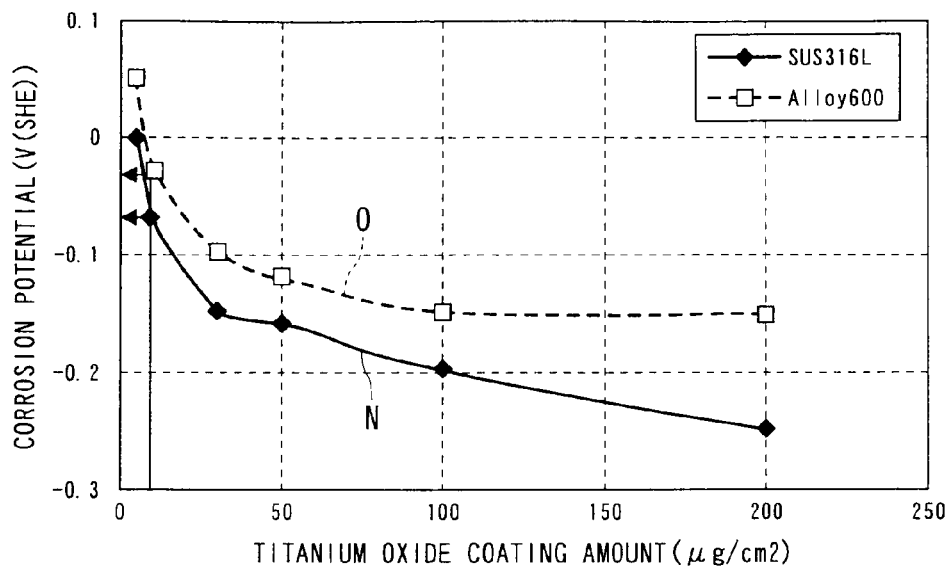
FIG. 9 is a graph showing the relationship between the amount of titanium oxide deposited and the corrosion potential.

FIG. 9 is a graph related to a third embodiment of the present invention.

In the description of the third embodiment, the structures identical to those of the first embodiment are referred to by the same reference numerals to omit repeated explanation, and the effects identical to those of the first embodiment are also attained, but omitted in description to avoid redundancy.

The graph in FIG. 9 shows the corrosion potential characteristics observed from a test piece in which the metal base material 50 composed of SUS316L is coated with an $Fe_3O_4$ oxide film 51 having the properties of a P-type semiconductor and a thickness of 0.05 μm, and from a test piece in which the metal base material 50 composed of a Ni-based stainless steel alloy, i.e., Alloy 600, is coated with a NiO oxide film 51 having a thickness of 0.05 μm, while varying the amount of titanium oxide serving as the catalytic substance 52 deposited on the oxide film 51.

The graph shows that as the amount of titanium oxide deposited on the oxide film 51 increases, the corrosion potential of the metal base material 50 decreases. A solid line N is a characteristic curve showing the relationship between the corrosion potential of the metal base material 50 composed of SUS316L and the amount of titanium oxide deposited. A dotted line O is a characteristic curve showing the relationship between the corrosion potential of the metal base material 50 composed of Alloy 600 and the amount of titanium oxide deposited.

The curves N and O show that when 10 μg/cm² of titanium oxide serving as the catalytic substance 52 is deposited, the corrosion potential of the metal base material 50 composed of SUS316L is lower or less than −0.05 V(SHE) and that of the metal base material 50 composed of Alloy 600 is lower or less than 0.0 V(SHE) due to the interaction with the P-type semiconductor. This result shows that stress corrosion cracking can be sufficiently suppressed by depositing the titanium oxide of the amount of 10 μg/cm² or more serving as the catalytic substance 52.

Fourth Embodiment

A fourth embodiment of the present invention will now be described with reference to FIGS. 1, 2, and 10 to 17.

The fourth embodiments represents a method of forming a corrosion-resistant coating, including a step of oxide film formation of forming an oxide film 51 having the properties of a P-type semiconductor on the surface of the nuclear power plant 10 shown in FIG. 1 and the metal base material 50, which is a structural component of the nuclear power plant 10, and a step of catalytic substance deposition of depositing the catalytic substance 52 on the oxide film 51.

There are provided methods possible to form a corrosion-resistant coating having the properties of a P-type semiconductor on the surface of the metal base material 50, the method including a method of preliminarily forming the coating before the metal base material 50 is processed and shipped as the reactor structural materials, a method of forming the coating during a trial run or operation after the structural materials are installed in the nuclear power plant 10, and a method of forming the coating during the operation of the nuclear power plant 10 by controlling the water chemistry. A method of forming the oxide film on the surface of the metal base material 50 according to any one of the timings may be employed.

The oxide film formed on the surface of the metal base material 50 is known to undergo a significant change due to ambient aquatic environment. In this embodiment, a method of forming an oxide film that takes into account the water chemistry controllable in the BWR 11 and a real plant is described from the viewpoint of preventing the corrosion of peripheral structural components such as those inside the BWR 11 and the recirculation pipe 20.

[First Method of Forming the Oxide Film]

A first method of forming the oxide film includes an oxide film forming step of forming the oxide film 51 having the properties of a P-type semiconductor directly from the metal base material 50. This first method is used when a new metal component is installed in the nuclear power plant 10. The oxide film 51 is deposited by controlling the ambient aquatic conditions.

The oxide film forming step for forming the oxide film 51 on the surface of the metal base material 50 in a real plant will be described hereunder.

For example, in order to improve the reactor water chemistry of an actual plant in which hydrogen injection operation is already carried out, dissolved hydrogen and dissolved oxygen are controlled at an injection amount of 0.4 ppm, and the surfaces of an austenitic stainless steel, SUS316L are oxidized with high-temperature water of 280° C. The dissolved oxygen concentration is about 10 ppb, and the dissolved hydrogen concentration is 30 ppb or more, i.e., about 80 ppb. The hydrogen injection is carried out by connecting the hydrogen injection system 46 to the injection points P of the reactor primary cooling system 45 and the cooling water circulation system 12 of the nuclear power plant 10.

Figure 10:
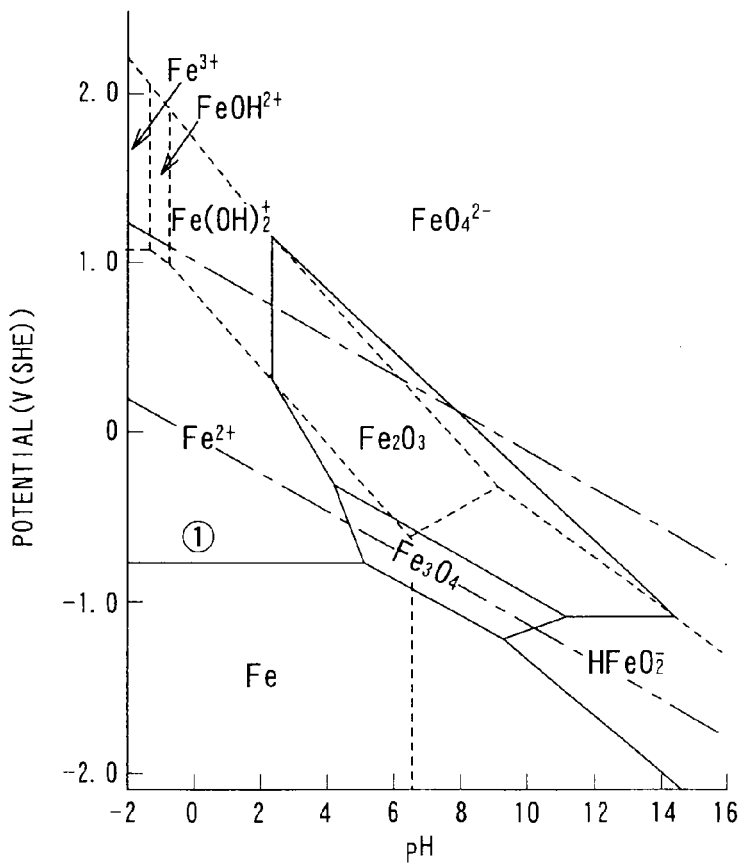
FIG. 10 is a graph showing the potential-pH diagram for $Fe—H_2O$ system.

In general, there are a large number of methods for forming an oxide film having the properties of a P-type semiconductor conducted in water having reducing properties, in which the reactor water is maintained at a reducing state by hydrogen injection. As far as the water chemistry of an actual plant is concerned, the hydrogen concentration in the feedwater is preferably 1.0 ppm or less, in particular, about 0.3 ppm during the operation of the nuclear power plant 10 since high-concentration hydrogen injection disadvantageously increases the turbine-system dose rate during the operation. In a reducing atmosphere, the corrosion potential of the metal surface is maintained at a low level. As shown in FIG. 10, the pH morphology of the ferrous oxide greatly changes with the change in corrosion potential brought about by controlling the water chemistry.

By controlling the chemistry of the reactor water as mentioned above, an oxide film having the properties of a P-type semiconductor can be formed. With respect to the temperature for forming the oxide film, it is possible to choose one from a method forming an oxide film at room temperature which takes a longer time and a method of forming an oxide film at a temperature of reactor water, e.g., about 280° C., which takes into account the actual operation of the reactor. It is possible to choose the timing by taking into account the status of the actual plant, e.g., whether the plant is under inspection or in operation.

FIG. 11 is a graph showing the corrosion potential observed under the water chemistry of the recirculation water in the reactor recirculation system 18 in which the hydrogen concentration in the feedwater is 1.0 ppm or less, in particular, about 0.3 ppm. In the observation, a test piece in which an oxide having properties of a P-type semiconductor was formed on the metal surface of SUS316L according to the first method of forming the oxide film was used. Before the corrosion potential testing, the test piece was exposed to high-temperature of 280° C. under the water chemistry of the reactor water at the reactor bottom (lower plenum), i.e., a feedwater hydrogen concentration of 0.4 ppm, for 500 hours. The surface of the resulting test piece was subjected to Raman analysis. The crystal morphology was confirmed to be $Fe_3O_4$.

Titanium oxide of an amount of 200 μg/cm² was deposited on the $Fe_3O_4$ oxide film 51 by using a sprayer 60 such as shown in FIG. 12.

The sprayer 60 has a spray main unit 61 equipped with a solution tank 62 for storing titanium oxide, i.e., the catalytic substance. Deposition of an adequate amount of titanium oxide on the test piece can be carried out by rotating an adjustor knob 64 to adjust the nozzle opening of a spray nozzle 63 attached to the front end of the spray main unit 61, connecting the spray main unit 61 to a gas supply (gas cylinder) 67 containing nitrogen gas or inert gas via a gas feed pipe 66 equipped with a flow adjustor valve 65, and then pulling a spray switch 68 which functions as a control lever. Titanium oxide, which is the catalytic substance, is sucked out by the flow of the inert or nitrogen gas and is sprayed toward the test piece from the nozzle opening of the spray nozzle 63.

Using this sprayer 60, titanium oxide serving as the catalytic substance was deposited onto the SUS316L test piece having the $Fe_3O_4$ oxide film 51. The test piece provided with a required amount of titanium oxide was subjected to corrosion potential testing in water having recirculation water chemistry in the reactor recirculation system 18, as shown in FIG. 11.

FIG. 11 shows that, in corrosion potential analysis of the test piece, a temperature elevation process (heating process) of recirculation water was conducted up to 200 minutes after initiation of the analysis and that the corrosion potential was measured at a constant recirculation water temperature after the temperature elevation process.

The recirculation water had a dissolved oxygen concentration of about 10 ppb, a dissolved hydrogen concentration of 30 ppb or more, in particular 31 ppb, and a hydrogen peroxide concentration of 65 ppb. The operation conditions, such as 280° C. high-temperature water and a pressure of 8.5 MPa, applicable to an actual plant were satisfied. As is apparent from the observed results of the corrosion potential, the corrosion potential of the test piece having titanium oxide deposited on the $Fe_3O_4$ oxide film 51 could be decreased to −0.1 V(SHE) or less, i.e., about −0.15 V(SHE), under the water chemistry of the recirculation water having a feedwater hydrogen concentration of 0.3 ppm, thereby improving the corrosion resistance. The test piece having no titanium oxide deposited on the $Fe_3O_4$ oxide film exhibited a corrosion potential increasing with time. The corrosion potential in this case is expected to further increase if the test is carried out for a longer time.

[Second Method of Forming the Oxide Film]

A second method of forming the oxide film includes a step of depositing atoms that constitute a P-type semiconductor onto the surface of the metal base material 50 and allowing an oxide having the properties of the P-type semiconductor to form by controlling the ambient aquatic conditions.

Although FIG. 1 shows the cooling water circulation system 12 of the nuclear power plant 10 in which the hydrogen injection system 46 is connected through the injection points P. In this method, a solution injection system 70 (shown in FIG. 13) including atoms which constitute the P-type semiconductor should be connected to the injection points P (Pa and Pb) to replace the hydrogen injection system 46.

Figure 13:
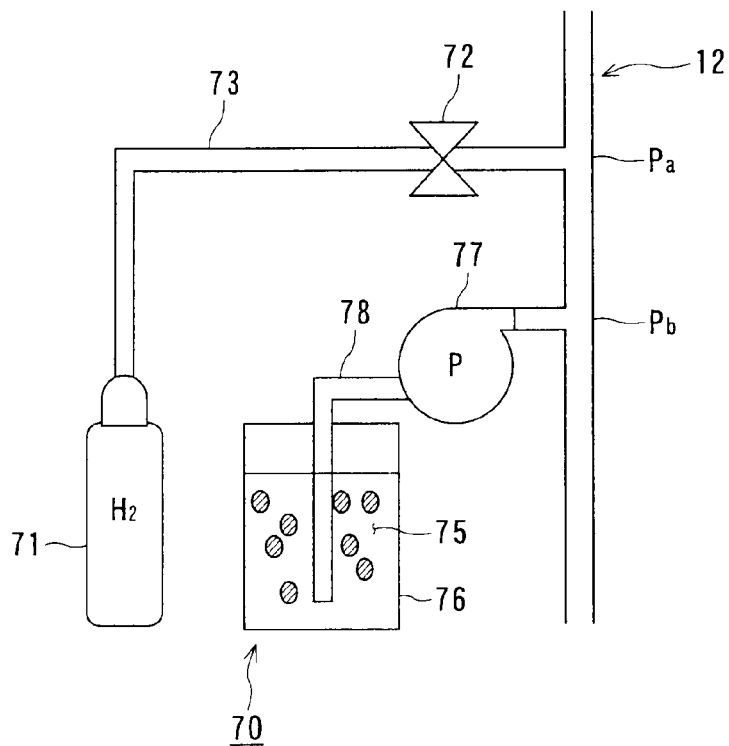
FIG. 13 is a schematic diagram showing a system for injecting atoms constituting a P-type semiconductor and a hydrogen injection system.

The solution injection system 70 containing atoms constituting the P-type semiconductor has a structure shown in FIG. 13 and is connected to the injection points P of the cooling water circulation system 12. As shown in FIG. 13, the solution injection system 70 includes a hydrogen tank 71 which is connected to the injection point Pa of the cooling water circulation system 12 via a hydrogen feeding pipe 73 equipped with a flow adjustor valve 72. Hydrogen gas inside the hydrogen tank 71 is injected into the cooling water circulation system 12 from the injection point Pa.

A solution 75 containing atoms which constitute the P-type semiconductor is stored in a solution tank 76, and the solution tank 76 is connected to the injection point Pb of the cooling water circulation system 12 via a solution injection pipe 78 having an injection pump 77.

In this second method of forming the oxide film, the injection pump 77 shown in FIG. 13 is operated to inject atoms constituting the P-type semiconductor into the cooling water circulation system 12. The atoms circulate inside the cooling water circulation system 12 with cooling water and are deposited onto the surface of the metal base material 50 constituting the reactor structural components.

The deposition of the atoms constituting the P-type semiconductor may be conducted during the shutdown or running operation of the reactor. In order to form an oxide having properties of a P-type semiconductor from the deposited atoms, the hydrogen gas controlled with the flow adjustor valve 72 in FIG. 13 is injected to change the chemistry of the reactor water.

In this manner, the ambient aquatic environment and potential can be controlled, and the atoms deposited on the metal surface can be grown into an oxide having the properties of the P-type semiconductor. As the deposited atoms form an oxide, an oxide film functioning as a corrosion-resistant coating is formed on the surfaces (including inner surfaces) of the metal base material 50.

Figure 14:
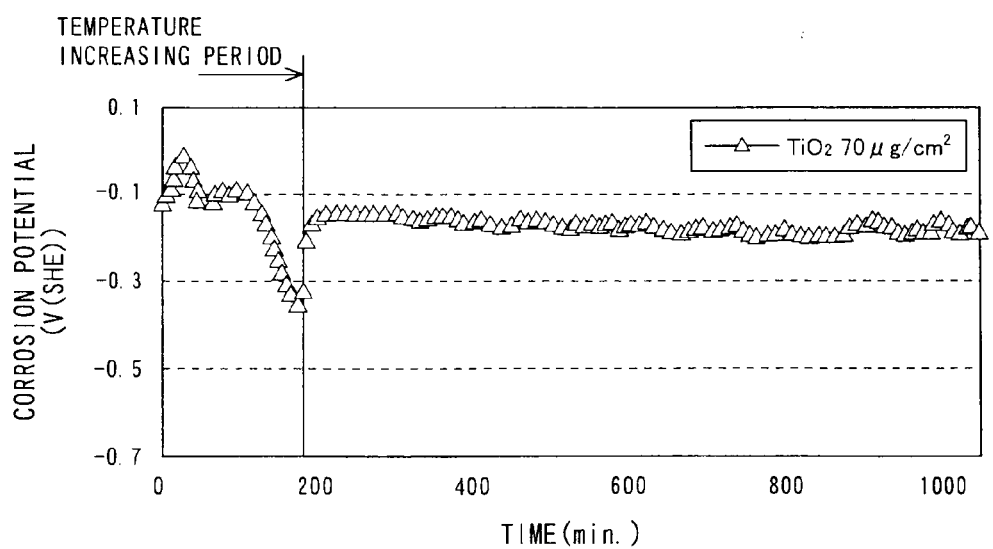
FIG. 14 is a graph showing the effect of reducing corrosion potential by the combination of $ZnCr_2O_4$ and $TiO_2$ (flame sprayed)

FIG. 14 is a graph showing the corrosion potential of a test piece observed under the water chemistry of the recirculation water having a feedwater hydrogen concentration of 0.3 ppm. The test piece includes an oxide having the properties of the P-type semiconductor formed on the surface of an austenitic stainless steel, SUS316L by the second method of forming the oxide film.

In this corrosion potential test, a Zn solution is injected to form the oxide film 51 on the surface of SUS316L. An oxide of $ZnCr_2O_4$ is formed on the surface of SUS316L by injecting the Zn solution. Titanium oxide serving as the catalytic substance is deposited in an amount of 70 μg/cm² on the oxide film 51 on SUS316L of this test piece by using a plasma spraying equipment (not shown in the drawing) in a catalytic substance deposition step. By depositing a required amount of titanium oxide on the $ZnCr_2O_4$ oxide film 51, the corrosion potential can be decreased to −0.1 V(SHE) or less under the water chemistry of the recirculation water having a feedwater hydrogen concentration of 0.3 ppm.

[Third Method of Forming an Oxide Film]

A third method of forming an oxide film includes a step of changing the properties of the existing oxide film 51 on the metal base material 50 by controlling the ambient aquatic environment and a catalytic substance deposition step of depositing a catalytic substance on the oxide film. In an actual plant, the operation is conducted under various water qualities or chemistries, such as those required for operation of a reactor without hydrogen injection or for ultra-low iron operation, depending the type of the nuclear power plant 10. Thus, the properties of the oxide film 51 formed on the metal base material 50 are also different.

By converting the oxide film 51 of the metal base material 50 through the controlling of the chemistry of the reactor water and potential, an oxide having the properties of a P-type semiconductor is produced. Alternatively, the metal base material 50 may be, for example, chemically decontaminated to expose the surface, and then an oxide having the properties of a P-type semiconductor may be deposited thereon by the first or second method of forming the oxide film so that a desired oxide film 51 can be formed on the surface of the metal base material 50.

Figure 15:
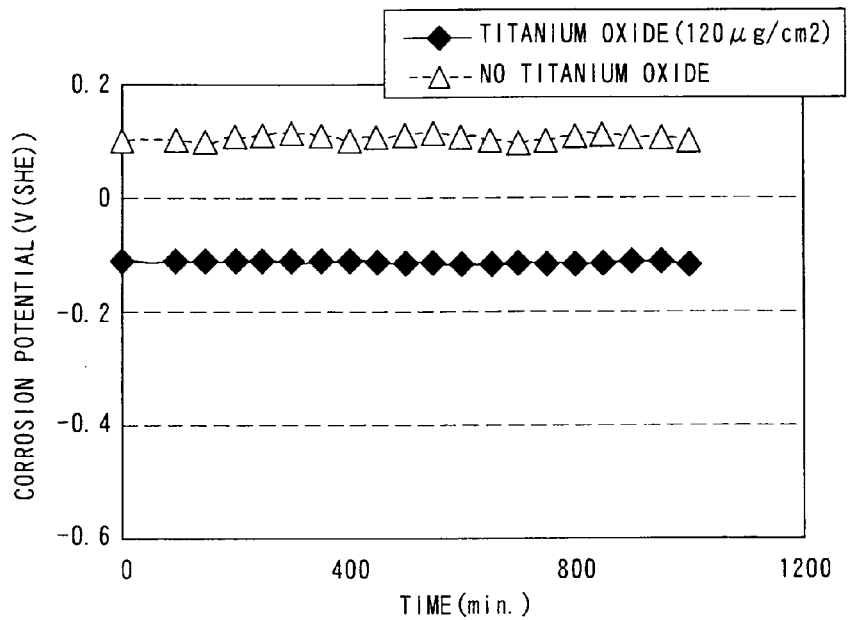
FIG. 15 is a graph showing the effect of reducing corrosion potential by the combination of $Fe_3O_4$ and $TiO_2$ (water chemistry deposition)

FIG. 15 shows corrosion potential of a test piece observed under the water chemistry of recirculation water having a feedwater hydrogen concentration of 0.3 ppm. The test piece had an oxide having the properties of a P-type semiconductor deposited on the surface of an austenitic stainless steel, SUS304L.

In this corrosion potential test, a test piece having an $Fe_2O_3$ oxide film was treated in water at 280° C. having a dissolved oxygen concentration of about 10 ppb and a dissolved hydrogen concentration of 30 ppb or more, in particular, about 80 ppb, for 100 hours. Subsequently, the test piece was subjected to surface analysis. The results showed that the oxide film was changed to an oxide film mainly composed of $Fe_3O_4$.

Subsequently, in the catalytic substance deposition step, a required amount, for example, 120 μg/cm², of titanium oxide was deposited using a titanium oxide water chemistry deposition device 80 shown in FIG. 16. The water chemistry deposition is a method of injecting a titanium oxide solution of a particular concentration into high-temperature water and controlling the temperature, flow rate, titanium oxide concentration, and duration to deposit titanium oxide on the metal surfaces. This corrosion potential test was conducted at 200° C., a flow rate of 9.6 m/s, and a titanium oxide concentration of 10 ppm for 24 hours. The water chemistry was controlled to that of the core bottom water having a feedwater hydrogen concentration of 0.4 ppm.

Figure 16:
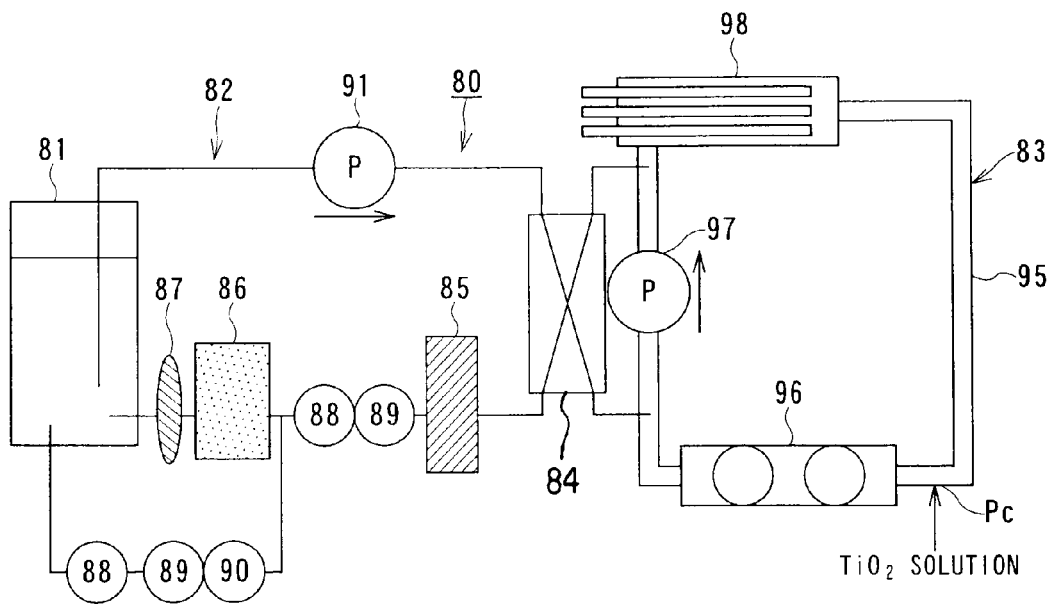
FIG. 16 is a schematic diagram showing a water chemistry deposition device.

The water chemistry deposition device 80 is an experimental device having a structure shown in FIG. 16. The water chemistry deposition device 80 has a water chemistry (chemistry) control system 82 for maintaining and controlling the chemistry of water inside a water tank 81 and a catalytic substance deposition controlling system 83 for controlling the amount of the catalytic substance deposited on the test piece.

Using a resin 86, such as an ion exchange resin, and a hollow fiber membrane filter 87, the water chemistry control system 82 purifies the water fed from the catalytic substance deposition controlling system 83 to the water tank 81 via a heat exchanger 84 and a cooling tower 85 to thereby produce pure water. The property of the resulting water is analyzed with a dissolved hydrogen meter 88, a dissolved oxygen meter 89, and a conductivity meter 90 to control the properties of the water inside the water tank 81 to the target levels.

The water (pure water) having its chemistry controlled through the resin 86 and the hollow fiber membrane filter 87 is temporarily stored in the water tank 81 and fed to the catalytic substance deposition controlling system 83 using a high-pressure pump 91 via the heat exchanger 84.

The catalytic substance deposition controlling system 83 is a closed circulation cycle 95. An example of injecting a titanium oxide ($TiO_2$) solution as the catalytic substance into the closed circulation cycle 95 will be described below.

The closed circulation cycle 95 includes a test piece deposition section 96 containing the test piece, a circulation pump 97 for controlling the amount and flow rate of water circulated, and a heat exchanger 98. These three devices are provided sequentially in this order. The suction side of the circulation pump 97 can in-take pure water fed from the water chemistry control system 82. The discharge side of the circulation pump 97 can discharge the pumped-out water to the water chemistry control system 82.

Figure 17:
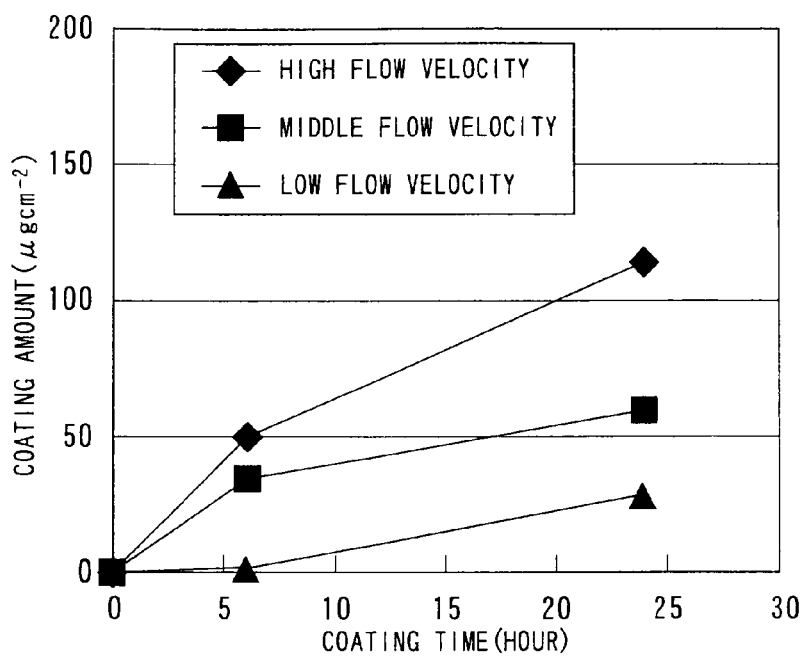
FIG. 17 is a graph showing the relationship between the amount of titanium oxide (catalytic substance) deposited and the deposition time and indicating the change-over time during the water chemistry deposition.

FIG. 17 is a graph showing the change in amount of deposited titanium oxide over time when titanium oxide serving as the catalytic substance 52 is deposited on the oxide film 51 of the test piece using the water chemistry deposition device 80. The graph shows that the amount of the titanium oxide deposited increases with an increase in flow rate in the closed circulation cycle 95. The time required for depositing a target amount of titanium oxide can be easily estimated by controlling the concentration of the titanium oxide injected and the temperature.

By converting the test piece deposition section 96, it becomes possible to deposit the catalytic substance, i.e., titanium oxide, onto surfaces of a reactor structural metal component having a different shape. In a case of installing a new reactor structural component, such as replacement of the recirculation pipe 20, it is possible to deposit an adequate amount of titanium oxide serving as the catalytic substance 52 on an existing oxide film 51 exhibiting the properties of a P-type semiconductor.

In an actual plant, the deposition of the catalytic substance 52 can be conducted by connecting a titanium oxide injection device, not shown, to the injection points P shown in FIG. 1. The deposition is possible during the reactor shutdown operation or during the running operation. As is apparent from the graph of FIG. 15, titanium oxide deposited on the oxide film 51 by water chemistry deposition using the water chemistry deposition device 80 can decrease the corrosion potential to −0.1 V(SHE) or less, and sufficient corrosion prevention effects can be efficiently exhibited.

Fifth Embodiment

A method of driving a reactor according to a fifth embodiment of the present invention will be further described hereunder with reference to FIGS. 18 to 21.

In consideration of the fact that measurement of the corrosion potential of the structural component surface of the reactor primary cooling system 45 and the cooling water circulation system 12 is difficult in an actual plant, in this embodiment, as shown in FIG. 1, the corrosion potential analyzer 47 accommodating a corrosion potential monitoring test piece 100 is provided to the nuclear power plant 10 so that the corrosion potential of the structural components in the reactor water can be simulated and that the safety of the structural components can be monitored. The corrosion potential monitoring test piece 100 is exposed to high-temperature water from the BWR 11.

Figure 18:
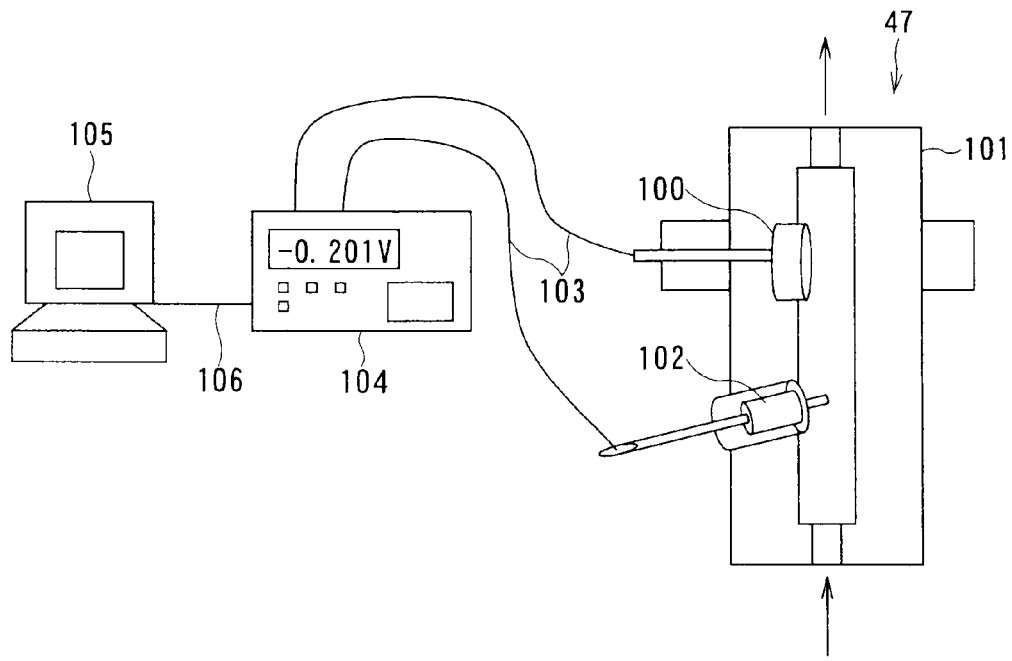
FIG. 18 is a schematic diagram showing the system for corrosion potential measurement.

As shown in FIG. 18, the corrosion potential analyzer 47 is a unit including a main device 101, the corrosion potential monitoring test piece 100, and a reference electrode 102 that can withstand high pressure. The corrosion potential monitoring test piece 100 and the reference electrode 102 are connected to an electrometer 104 via a cable 103. The corrosion potential of the corrosion potential monitoring test piece 100 measured with the electrometer 104 is input to a computer, i.e., a personal computer 105, either via a data cable 106 or by radio transmission, stored, and processed. By monitoring the processed data, the durability of the structural components and the properties of the oxide film can be monitored.

The main device 101 having the corrosion potential monitoring test piece 100 and the reference electrode 102 of the corrosion potential analyzer 47 is detachably attached to the recirculation pipe 20 of the reactor recirculation system 18, as shown in FIG. 1. Alternatively, the main device 101 may be attached to the cooling water circulation system 12 or the reactor primary cooling system 45.

Figure 19:
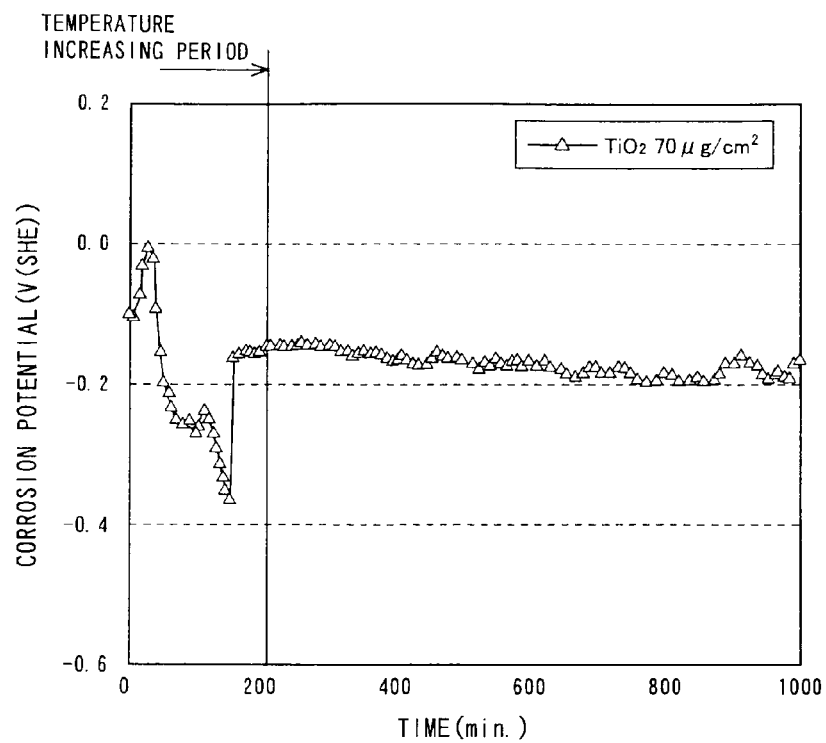
FIG. 19 is a graph showing the change in corrosion potential over time under water chemistry of recirculation water corresponding to a feedwater hydrogen concentration of 0.3 ppm.
Figure 20:
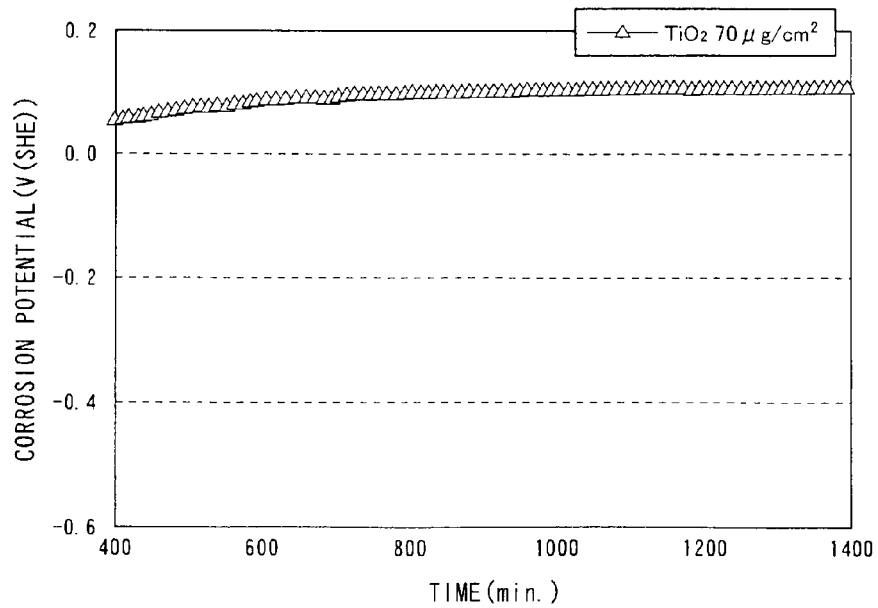
FIG. 20 is a graph showing the change in corrosion potential over time under the water chemistry of recirculation water corresponding to a feedwater hydrogen concentration of 0.1 ppm.
Figure 21:
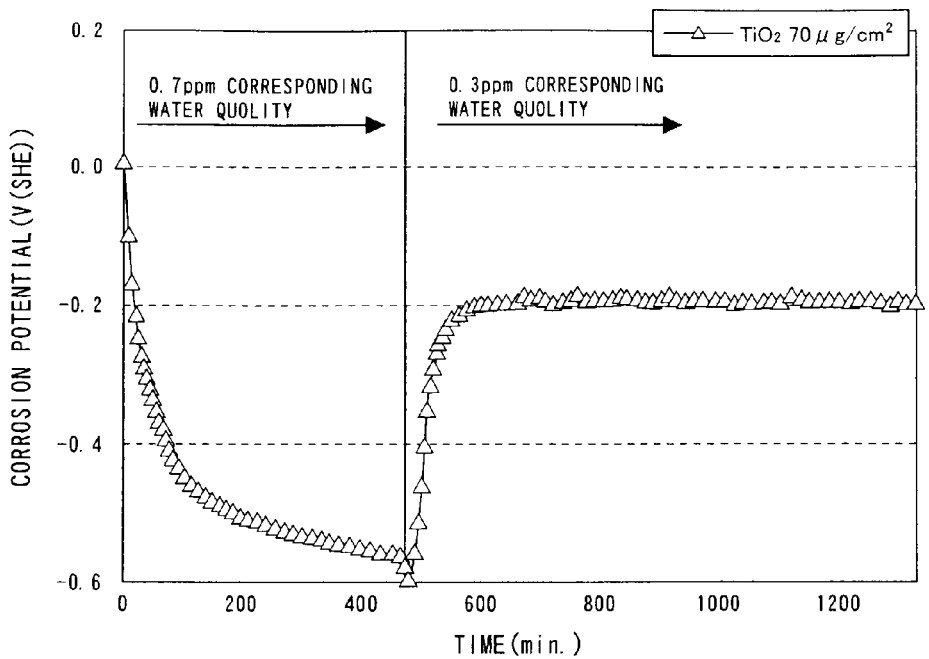
FIG. 21 is a graph showing the method of reducing and maintaining an oxide film by reduction in order to maintain a low corrosion potential.

FIGS. 19 to 21 are graphs showing the change in corrosion potential of the structural component of the nuclear power plant 10 in time elapsing due to changes in water chemistry.

The graph in FIG. 19 shows the corrosion potential of a test piece in which an $Fe_3O_4$ oxide film 51 is formed on the surface of SUS316L under the water chemistry corresponding to that of the recirculation water having a feedwater hydrogen concentration of 0.3 ppm and in which 70 μg/cm² of titanium oxide serving as the catalytic substance 52 is deposited onto the oxide film 51 by spraying. The first 200 minutes from the start of corrosion potential testing was spent for adjusting the water chemistry and measurement conditions under elevating temperature. Under the water chemistry corresponding to that of recirculation water having a feedwater hydrogen concentration of 0.3 ppm, a low corrosion potential was maintained due to the presence of titanium oxide, and the corrosion potential of the test piece was not more than −0.1 V(SHE).

On the next day, the water chemistry was controlled to that of the recirculation water having a feedwater hydrogen concentration of 0.1 ppm. The results of the corrosion potential measurement are shown in FIG. 20. Under the water chemistry corresponding to a feedwater hydrogen concentration of 0.1 ppm, the corrosion potential increased to a level 0.0 V(SHE) or higher despite the deposition of titanium oxide. These results show that under an oxidizing atmosphere corresponding to a feedwater hydrogen concentration of 0.1 ppm, the metal surface cannot maintain the properties or performances of the P-type semiconductor, and the pn-junction face cannot be utilized. In other words, the effect of suppressing recombination of an electron and a hole is no longer exhibited, and the thermally excited electron recombines with the hole.

Two days after, the water chemistry was changed to that of PLR (Primary Loop Recirculation) with a feedwater hydrogen concentration of 0.7 ppm or more, e.g., 0.7 ppm, to monitor the change in corrosion potential. In FIG. 21, the objective is to restore the P-type semiconductor properties in the oxide film in a reducing atmosphere corresponding to a feedwater hydrogen concentration of 0.7 ppm until up to about 450 minutes. As shown in the graph, the corrosion potential of the test piece with titanium oxide deposited thereon significantly decreased to about −0.55 V(SHE).

As shown in FIG. 10, it can be assumed that the oxide film 51 changed from $Fe_2O_3$ to $Fe_3O_4$ due to the change in corrosion potential. After 500 minutes, the water chemistry was controlled to that corresponding to a feedwater hydrogen concentration of 0.3 ppm, thereby decreasing the reducing atmosphere, and the corrosion potential was measured under a steady state. The results shown in FIG. 21 show that a corrosion potential not exceeding −0.1 V(SHE) is maintained even after 1,000 minutes. This shows that even when the oxide film 51 has experienced the oxidizing atmosphere and changed in properties, the P-type semiconductor properties can be restored in the oxide film 51 by decreasing the corrosion potential to, for example, −0.5 V(SHE) or less in a reducing atmosphere, and that this oxide film 51 can still maintain a low potential in a moderately reducing atmosphere corresponding to a feedwater hydrogen concentration of 0.3 ppm.

In an actual plant, it is possible to maintain and restore the corrosion-resistant coating and to thereby suppress corrosion of the metals of the reactor structural components by using the hydrogen injection system 46 (see FIG. 1) to change the reactor water chemistry and by monitoring the corrosion potential to set the corrosion potential of the material to the target level.

Sixth Embodiment

Figure 22:
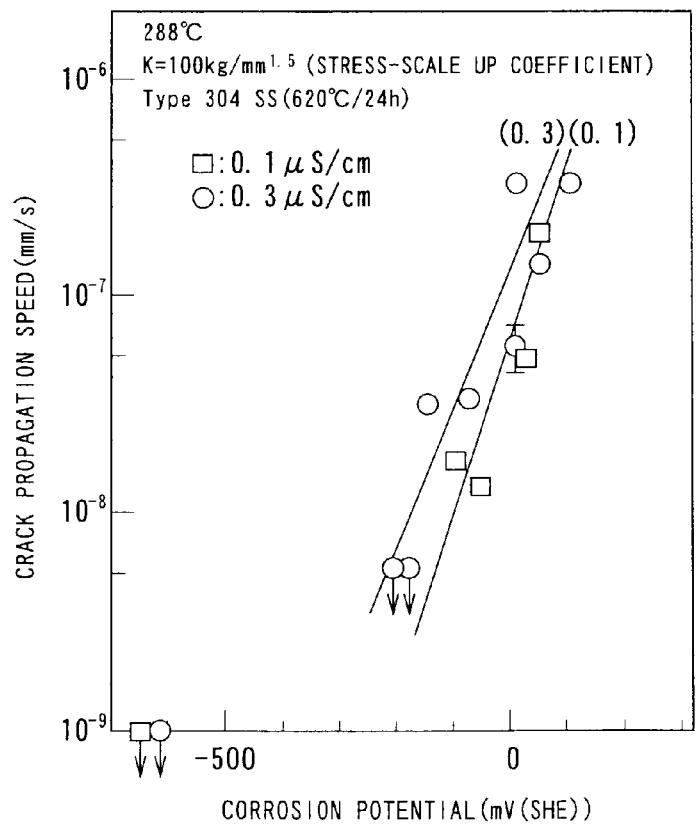
FIG. 22 is a graph showing the relationship between the corrosion potential and crack growth rate.

FIG. 22 is a graph for explaining a sixth embodiment of the present invention.

The graph shows the relationship between the corrosion potential of the structural components used in the nuclear power plant 10 and the rate at which cracks are developed. The crack development rate indicated by the longitudinal axis is logarithmically plotted. As the corrosion potential decreases, the crack development rate is largely decreased, showing that the development of the cracks is significantly suppressed.

It is a well-known fact that the corrosion potential under normal water chemistry (NWC) of a typical BWR 11 is about +100 mV(SHE). The results of the monitoring of the corrosion potential of the reactor structural component indicate that the crack development rate can be reduced by about one order of magnitude by maintaining the oxide film 51 such that the corrosion potential of the austenitic stainless steel (SUS304SS) is −50 mV(SHE) or less. This also shows that sufficient corrosion suppressing effect is exhibited. The corrosion suppressing potential for the Ni-based stainless steel alloy, such as Alloy 600, is also evaluated based on the same concept.

In the graph shown in FIG. 22, "K" represents a stress intensity factor indicating susceptibility of reactor structural components to crack, and "µS/cm" is a value indicating the purity of water, such as reactor water. In a typical reactor 11, a purity of about 1.0 µS/cm is observed during the inspection.

FIG. 22 shows that the crack development rate observed with reactor water having a purity as high as 0.1 µS/cm is significantly lower than that with reactor water having a purity of 0.3 µS/cm even when the corrosion potentials of the reactor structural components are the same.

Note that although the embodiments above concern application of the reactor recirculation system to boiling water reactors having circulation pumps outside the reactor, application to improved boiling water reactors having reactor recirculation pumps inside the reactor pressure vessels is also possible. The present invention can also be applied to nuclear power plants having pressurized-water reactors and CANDU reactors (Canadian deuterium uranium reactors).

What is claimed is:

1. A method of forming a corrosion-resistant coating, the method comprising:
controlling a water chemistry inside a reactor to have a feedwater hydrogen concentration of 1.0 ppm or less with a hydrogen injection device, to deposit an oxide film having a property of a P-type semiconductor in a reducing atmosphere or converting an existing oxide film on a surface of a metal component of a reactor structure exposed to high-temperature water; and
depositing, on the oxide film, a catalytic substance having a property of an N-type semiconductor, thereby forming a corrosion-resistant coating having a p-n junction,
wherein the oxide film of the corrosion-resistant coating retains the property of the P-type semiconductor.

2. The method of claim 1, wherein the reducing atmosphere comprises high-temperature water having a dissolved hydrogen concentration of 30 ppb or more.

3. The method of claim 1, wherein the reducing atmosphere has a feedwater hydrogen concentration of 0.3 ppm.

4. The method of claim 1, wherein the reducing atmosphere is adjusted such that the corrosion potential is −0.4 V(SHE).

5. The method of claim 1, wherein the oxide film having the property of the P-type semiconductor is formed on the surface of the metal component by controlling the ambient aquatic environment to convert an existing oxide film on the metal surface to the oxide having the property of the P-type semiconductor.

6. The method of claim 1, wherein the oxide film having the property of the P-type semiconductor is formed on the surface of the metal component by removing an existing oxide film on the metal surface in a reducing atmosphere having a feedwater hydrogen concentration of 0.3 ppm and a corrosion potential of −0.4 V(SHE) by removing and converting an exposed surface portion of the metal component into the oxide film having the property of the P-type semiconductor.

7. The method of claim 1, wherein the catalytic substance on the oxide film is deposited through a spraying process, a flame spraying process or a water chemical injection process.

8. The method of claim 1, wherein the oxide film is $Fe_3O_4$.

9. The method of claim 1, wherein the catalytic substance is $TiO_2$.

10. The method of claim 8, wherein the catalytic substance is $TiO_2$.

11. The method of claim 1, wherein the oxide film has a thickness of 0.1 µm or less.

12. The method of claim 1, wherein the amount of the catalytic substance deposited on the oxide film is at least 100 µg/cm$^2$.

13. The method of claim 9, wherein the amount of the catalytic substance deposited on the oxide film is at least 100 µg/cm$^2$.

* * * * *